United States Patent [19]
Brilakis

[11] 4,118,876
[45] Oct. 10, 1978

[54] PROGRAMMABLE QUESTION AND ANSWER DEVICE

[76] Inventor: Antony A. Brilakis, 300 Franklin St., Haworth, N.J. 07641

[21] Appl. No.: 729,591

[22] Filed: Oct. 4, 1976

[51] Int. Cl.² .............................................. G09B 7/06
[52] U.S. Cl. ..................................... 35/9 A; 35/48 R
[58] Field of Search ................... 35/6, 8 R, 9 R, 9 A, 35/9 B, 9 C, 9 D, 30, 31 C, 48 R, 8 A, 10, 8, 9, 31, 48; 364/200 MS File, 900 MS File

[56] References Cited

U.S. PATENT DOCUMENTS

| | | | |
|---|---|---|---|
| 3,141,243 | 7/1964 | Chapman et al. | 35/9 A |
| 3,206,871 | 9/1965 | Schure et al. | 35/48 R |
| 3,570,146 | 3/1971 | Golden | 35/48 R |
| 3,577,657 | 5/1971 | Plumly et al. | 35/9 A |
| 3,626,608 | 12/1971 | Ingeneri | 35/9 B |
| 3,748,754 | 7/1973 | LaBerge | 35/48 R |
| 3,771,240 | 11/1973 | Matui | 35/9 R |
| 3,854,226 | 12/1974 | Divine et al. | 35/9 B X |
| 3,919,788 | 11/1975 | Ingeneri | 35/9 B |
| 3,996,671 | 12/1976 | Foster | 35/9 A X |

OTHER PUBLICATIONS

Computer Aided Experimentation; Finkel, J.; 1975; p. 372.

Primary Examiner—Vance Y. Hum
Attorney, Agent, or Firm—Constantine A. Michalos

[57] ABSTRACT

A programmable question and answer device having combined testing and teaching modes with multiple answer set programs. The device is comprised of a plurality of answer keys mounted on a housing, non-volatile, read only memory having a plurality of stored binary words parallelably outputted by a corresponding parallel input address code, control logic connected to the read only memory, program selector, and display. The program selector includes an activator strip having a coded pattern corresponding to a selected answer set. When the activator strip is inserted into the device, a particular program sequence is initiated. The display includes a display showing the accumulated score of correctly answered questions, next question number display, correct answer display when an incorrect answer key is depressed, and indicators to show when a question has been correctly or incorrectly answered. Due to the large number of different answer sets available from the read only memory and program selector, a student cannot memorize the answer sequences during repeated testing.

6 Claims, 7 Drawing Figures

PROGRAMMABLE QUESTION AND ANSWER DEVICE

BACKGROUND OF THE INVENTION

1. Field of the Invention

In general, this invention is related to education question and answer devices. More particularly, this invention is concerned with a programmable question and answer device having combined testing and teaching modes of operation with multiple answer set programs.

2. Description of the Prior Art

Although a wide variety of question and answer devices have previously been offered, they all suffered from various limitations and dificiencies. For example, some devices had only one or two answer sets which a student could easily memorize in a short time. This type of device would tend to induce a student to learn the answer pattern of an answer set rather than allowing him to concentrate on the subject matter of the question. This limitation, therefore, would essentially defeat the purpose of the device.

In more complex devices excessive time would be required for setting up complicated programming procedures. Consequently, the greater expense and extra time for these devices made them impractical for mass education and the general public.

In addition, many previous devices would merely indicate that a student's answer was correct. When a student answered incorrectly he would not immediately know the correct answer. Therefore, this type of device would not teach him new knowledge.

Another problem previously encountered was the large size of these testing devices. Since they could not be carried in a pocket their use was not accepted by the general public.

These problems have been solved a large extent by the present invention which provides the following: a large number of answer sets which can be simply programmed by inserting an activator strip into the device; selectively activated displays which permit combined testing and teaching modes of operation; and the unique utilization of low power, low cost, integrated circuits in order to yield a pocket-sized educational device for the mass market.

SUMMARY

A programmed question and answer educational device having a large number of answer sets so that a student cannot memorize the answer sequences during repeated testing. The device is basically comprised of: a plurality of answer keys mounted on a pocket-size housing; a nonvolatile read only memory; control logic means; program selector means; and display means. In order to program the device for a particular answer set, the student merely inserts an activator strip into the device. In one embodiment of the activator strip, the coding pattern is in the form of a printed circuit which selectively connects mating electromechanical switches within the housing. In another embodiment of the activator strip, the coding pattern is accomplished by slotted aperatures that permit conductive elastomer switches on both sides of the inserted activator strip to be selectively connected. For proper matching, a coded number is assigned to each activator strip and its corresponding question sheet.

Wrap around and reverse modes of operation for an address counter that connects to the read only memory permits not only a large number of answer sets but also allows for a large number of questions within an answer set. Electronically activated displays include: number of correct answers; next question; indicators to show when an answer is correct or incorrect; and a display showing the correct answers when an incorrect answer key was depressed.

Accordingly, a principal object of this invention is to provide a question and answer device having a large number of answer sets so that a student cannot memorize answer sequences during repeated testing.

Another object of this invention is to provide combined testing and teaching modes of operation so that if a student answers a question incorrectly he immediately thereafter knows the correct answer and therefore gains new knowledge.

Still another feature of the present invention is to provide simplified programming of the device by means of an activator strip which permits multiple switching in one step.

An additional basic object of the invention is to provide a pocket-sized, programmable, educational device utilizing low cost integrated circuitry for the mass market.

The foregoing and other objects and features of the invention will be more thoroughly understood by reference to the following detailed description of an illustrative embodiment of the invention in conjunction with the accompanying drawings.

BRIEF DESCRIPTION OF THE DRAWINGS

Similar reference characters refer to similar elements throughout the description of the drawings.

DESCRIPTION OF PREFERRED EMBODIMENT(S)

Figure 1:
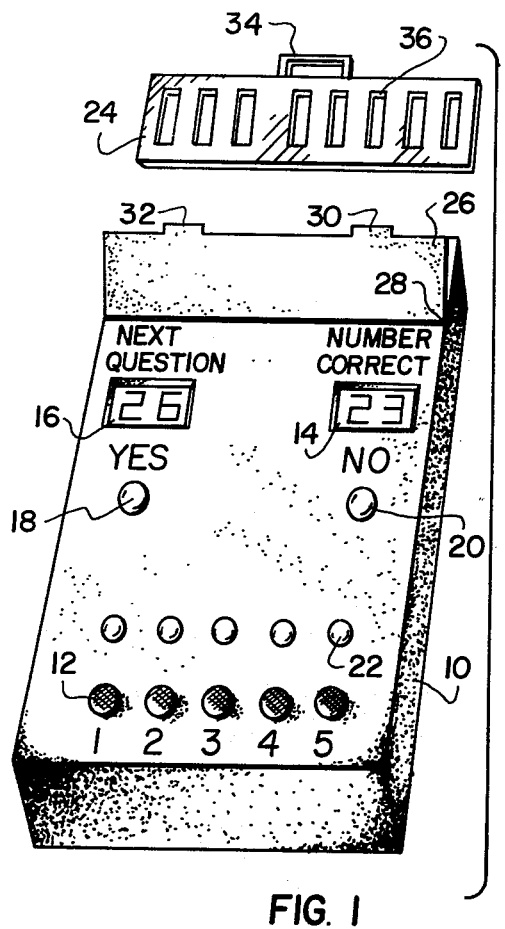
FIG. 1 is a perspective view of the device showing a housing, answer keys, displays, and an activator strip prior to insertion.

Referring now to FIG. 1, a pocket-sized housing 10 is shown containing five numerically indexed answer keys 12, a number correct display 14, a next question display 16, a "Yes" indicator 20 to show that an incorrect answer key was depressed, a "No" indicator 20 to show that an incorrect answer key was depressed, and correct answer indicators 22 above their corresponding answer keys 12. The name selected for this device is CAL-CULEARNER.

In a typical operational sequence, a student or teacher inserts an activator strip 24 into the device and clamps a hinged cover 26 onto the activator strip 24 so that selected programming switches within the housing are closed. The activator strip 24 is held securely and in proper alignment by means of fasteners 30, 32.

Figure 6:
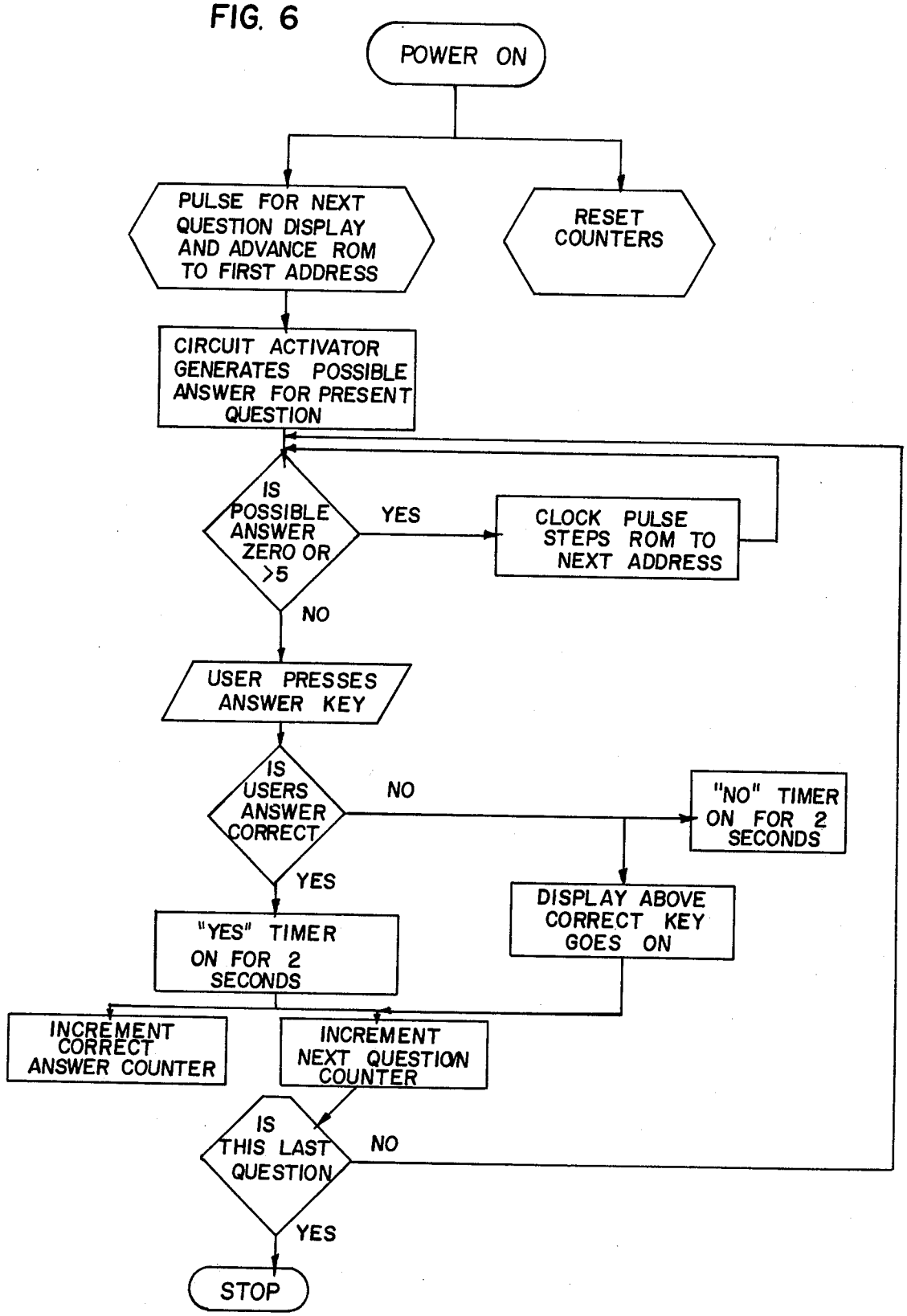
FIG. 6 is a flow chart showing the logical sequence of operations for the device.

The application of power then resets the device and the first question of the answer set is ready to be answered. After the student reads the first question on a question sheet, he then selects an answer from the five choices listed and presses the corresponding answer key on the device. If his answer is correct, then the "Yes" indicator 18 lights up for two seconds, the number correct display 14 indicates "1", and the next question display 16 advances to "2". On the other hand, if his answer is incorrect, the "No" display 20 lights up for two seconds, the number correct display shows "0", the indicator 22 above the correct answer key is lit for 2 seconds, and the next question display 16 advances to "2". In this manner, the student is taught immediately the correct answer so that he gains new knowledge while his mind is in a receptive state. As a result of this type of combined testing and teaching modes of operation, a more efficient feedback learning loop is established. A flow chart showing the logical sequence of operations for the device is depicted in FIG. 6.

An important feature of the CALCULEARNER is the provision for a large number of different answer sets so that a student cannot memorize answer sequences. This is accomplished by means of an integrated circuit read-only-memory (ROM) in conjunction with a program selector which is comprised of an activator strip and associated programming switches.

Figure 7:
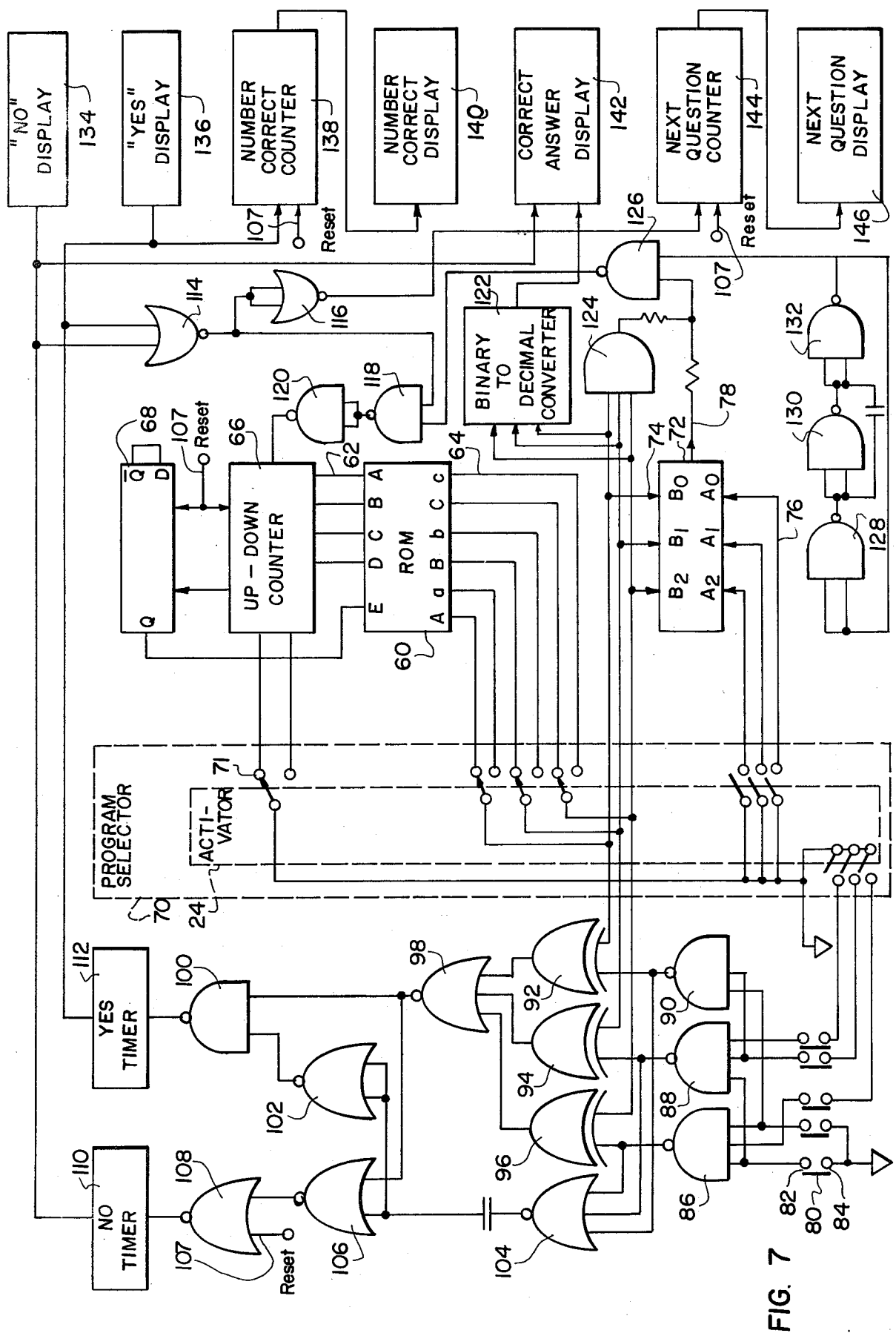
FIG. 7 is a circuit schematic diagram of the device illustrating selective circuit details in conjunction with circuit blocks.

A typical ROM 60, selected for the illustrative example, is shown in FIG. 7. It is a non-volatile, or permanent, type storing thirty-two parallelably outputted binary words where each word is eight bits long and is addressed by five parallel input lines. The ROM is basically comprised of a transistor array fabricated into horizontal and vertical rows utilizing a metal-oxide semiconductor (MOS) structure to yield a memory, having a high packaging density and low power consumption.

Although a ROM 60 by itself only provides a single answer set, the number of sets can be increased greatly by means of the activator strip. In the present example, the eight output lines 64 have been divided into two 3-bit groups, ABC and abc with the remaining 2 bits (D and d) unused. A particular answer is formed by combining bits from these two groups into a pattern selected via the activator strip 24. The eight possible bit combination patterns are: ABC; ABc; AbC; Abc; aBC; aBc; abC, and abc. A given activator strip 24 can set up only one of these bit combinations, for example, AbC, but once selected, it provides a unique sequence of numbers in the range 0 to 7. Once the set of ABC and abc bits have been programmed into the ROM 60, it cannot be changed. However, the ROM itself can be easily changed to provide any combination of bits.

The eight unique answer sets for a given ROM 60 may be increased to 16 by means of an up-down address counter 66 which allows the direction of progression through the answer set to be either forward or backward. The number of answer sets may be further increased to 32 by utilizing bits D and d. If desired, additional circuitry could provide for the selection of the first answer at any of the 32 possible positions in the question series which would increase the number of answer sets to 1,024. However, for the illustrative example only sixteen answer sets will be considered.

Once an answer set has been selected via the activator strips 24, two further processes act to alter the sequence of answers. When question sheets provide for either four or five answer choices per question, the basic answer set will still contain a sequence of thirty-two answers in the range of 0 to 7. However, answers 0, 6 and 7 are not permissible so logic is provided to skip over these and they will not be visible to the user. The selected answer set will contain less than thirty-two possible answers, the total being reduced by the number of 0, 6 and 7 answers generated by the activator strip 24. For example, if the ROM 60 and the activator strip 24 generate answers 5, 1, 3, 7, 4, 6, 0, 2, only answers 5, 1, 3, 4, 2 will be available for use as shown in Table 1.

TABLE I

| Address | AaBbCc | Answer Selected by Activator for AbC | Permissible Answers Using 5 Choices |
|---|---|---|---|
| 1 | 100010 | 101 = 5 | 5 |
| 2 | 010010 | 001 = 1 | 1 |
| 3 | 011110 | 011 = 3 | 3 |
| 4 | 100110 | 111 = 7 | * |
| 5 | 101001 | 100 = 4 | 4 |
| 6 | 110100 | 110 = 6 | * |
| 7 | 011001 | 000 = 0 | * |
| 8 | 010101 | 010 = 2 | 2 |

*Indicates answer is unacceptable for this set.

In a similar manner, when there are only four answer selections to be provided, the logic automatically rejects generated answers which are greater than four, so the above series of permissible answers would become 1, 3, 4, 2.

A second process that alters the sequence of answers occurs when the question sheet provides either two or three choices per question. In order to minimize the number of generated answers which would be rejected as being greater than two or three when the permissible range is 0 to 7, a further logical operation ignores the first bit, A or a, of the three-bit generated answer in these cases. Thus the ROM-activator generated set of answers now lies in the range 0 to 3. A generated answer of 0 will always be skipped as will an answer of 3 when there are only two answer choices provided.

There is no limit to the number of questions which can be handled by a selected answer set as the logic provided for wrap around such that when the last answer is reached from the available thirty-two answers, the next answer will be obtained by reverting to the top of the thirty-two answer stack. In practice, only ninety-nine questions may be handled in one session since the displays provided on the CALCULEARNER contain only two digits each.

Since the functions of the activator strip 24 are essential to the operation of the CALCULEARNER, they will be reviewed briefly. These functions are basically: selection of the combinations of bit groups ABC and abc to provide the generated answer set; de-activation of answer buttons 5, 4, 3 when there are 4, 3, 2 answer selections respectively, so that an "illegal" answer will then be ignored by the CALCULEARNER and definition of the number of answer selections so that generated answers which are "illegal" will be skipped.

Figure 3:
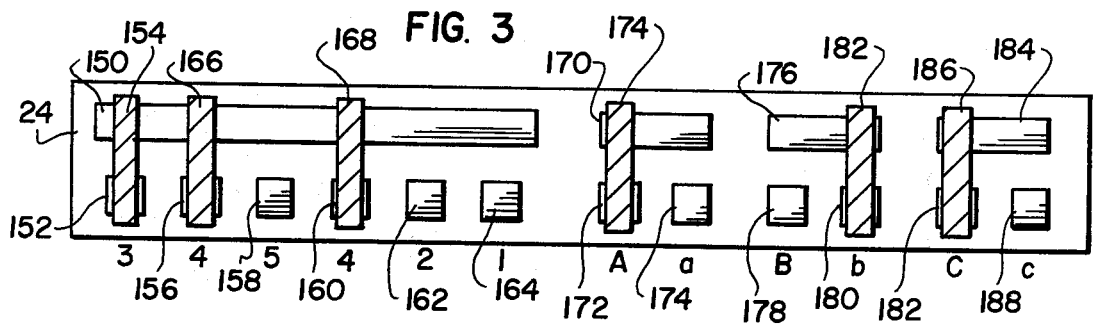
FIG. 3 is a plan view of a functional diagrams of the activator strip and its mating switches.

The activator strip 29 basically provides a set of switches which performs the above functions. For illustrative purposes, a functional diagram of the activator strip and its mating switches is shown in FIG. 3. Typical conductive pads 150 and 152 located on the housing 10 are switched together by another conductive pad 154 located on the activator strip 24. Conductive pads 152, 156, and 158 are reserved for activating answer keys 3, 4, or 5 (keys 1 and 2 are always active) while conductive pads 160, 162 and 164 activate the logic to reject generated answers which are greater than a certain number. Pads 160, 162 and 164 have respective weights of 4, 2 and 1 which can be combined to give any value desired. Similarly, conductive pads 172, 174, 178, 180, 182 and 188 set up the bit pattern for a selected answer set derived from the ROM 60. The coding pattern shown in FIG. 3 has been arranged for the case where there are four answer choices for each question, and bit pattern A$b$C selects the answer set.

Figure 2:
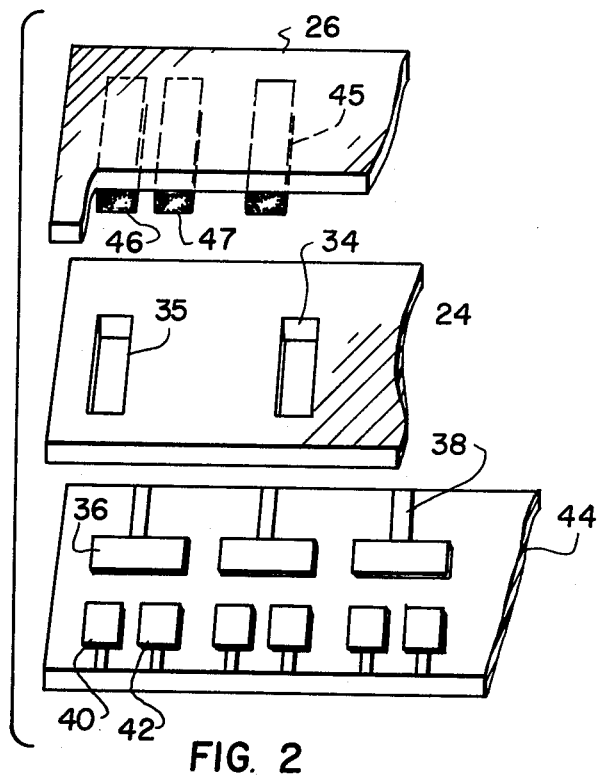
FIG. 2 illustrates a first embodiment of the activator strip in a fragmented and exploded view between mating surfaces of the housing and in alignment with switch contacts.

One embodiment of the activator strip 24, illustrated in FIG. 2, utilizes conductive elastomer pads 45, 46, 47 mounted on the hinged cover 26 which deforms under slight pressure and presses through the slotted apertures 34, 35 of the activator 24 making electrical contact with metallic conductive pads 40, 36 on the other side. Specifically, elastomer pad 46 in alignment with slotted aperture 35 will connect together metallic pads 40 and 36, located on a fixed base within the housing, which in turn are connected to the ROM or control logic by means of printed circuit connections 37, 38.

Figure 4:
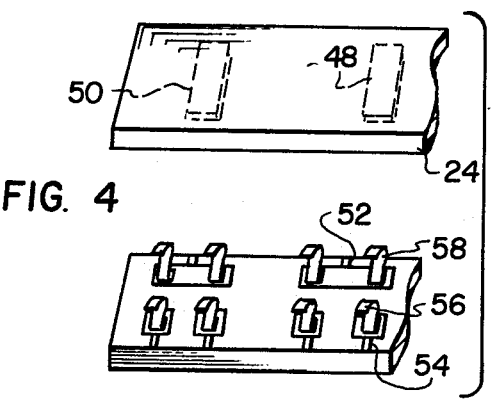
FIG. 4 is a fragmented and exploded view showing a second embodiment of the activator strip with its printed circuit coding pads in alignment with spring switches in the housing.
Figure 5:
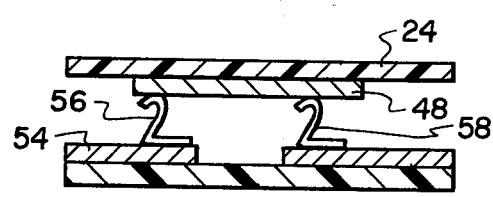
FIG. 5 is a cross sectional view of the second embodiment of the activator strip in contact with its mating switches.

Another embodiment of the activator strip 24, shown in FIGS. 4 and 5, uses metallic pads 48, 50 on the activator strip 24 for making the desired electrical connection between spring contacts 56, 58 located on a fixed base within the housing 10. When the activator strip 24 is inserted into the device, the hinged cover 26 then clamps the activator strip into position by means of fasteners 30, 32. The resilient action of spring contacts 56, 58 ensures reliable electrical contact with the pad 48 on the activator strip 24. The springs 56, 58 are connected to other circuitry by means of printed circuit connections 52, 54.

The diagram in FIG. 7 depicts certain circuit details of the CALCULEARNER. Control logic cooperating with the ROM 60 and program selector 70 is functionally divided into sequential logic, comparison logic, and disply timing logic. Sequential logic is comprised of ROM address counter 66, number correct counter 138, next question counter 149 and logic gates 116, 118, 120, 124, and 126. Circuitry for comparison logic is comprised of a three-bit digital comparator 72 and logic gates 86, 88, 90, 92, 94, 96, and 98. Display timing logic is comprised of logic gates 104, 106, and 107 driving a "No" timer 110 which gates 100 and 102 are used for driving a "Yes" timer 112.

Initial power turn-on generates a reset pulse 107 for the number correct 138 and next question counter 144, and for the ROM address counter 66. This pulse 107 also triggers the incorrect answer time 110

Initial power turn-on generates a reset pulse 107 for the number correct 138 and next question counter 144, and for the ROM address counter 66. This pulse 107 also triggers the incorrect answer timer 110 which advances the next question display 146 to 1 and advances the ROM 60 to the first applicable address.

Flip-flop 68 and counter 66 form a five-bit presettable up/down counter which generates sequential address (EDCBA) for the ROM 60 containing the answer generating sequences (A$a$B$b$C$c$). The six bits for the addressed answer are brought out to the activator 24 where three bits (B2, B1, B0) are extracted through the activator card, generating the answer for the present question. This answer is then checked in magnitude to see whether it is either zero (through gate 124) or greater than the number of answer choices presently in use (through comparator 72 and the activator). If the three bits pass both these tests, they are held as a permissable answer to be checked against the user's input answer. Should either test fail, inhibit gate 126 is opened, allowing clock pulses generated from 128, 130, and 132 (an oscillator operating at a nominal frequency of 15 kHz) to pass to 118, inverted by 120 and then to the address generator 66, 68. New addresses are continuously generated until a permissible answer is found, upon which gate 126 closes preventing further address clocking. The CALCULEARNER now waits for an answer to be input by the user.

When an answer button 80 is closed, the selected answer is converted to binary form by gates 86, 88, 90 and a clock pulse is generated by 104. The selected answer is compared with the correct answer by gates 92, 94, 96, 98 and, if correct the "Yes" timer 112 is turned on via gates 102, 100. While the timer is on (nominally two seconds), the "Yes" indicator 18 is turned on and the number of correct answers display 14 is incremented (rising clock pulse). At the end of this time, the next question display 16 is incremented (falling clock pulse inverted gat 116) and the ROM 60 is clocked through to its next permissible answer as described above.

Should the user's answer be incorrect (answer does not compare with the generated correct answer), the "No" timer 110 is turned on via gates 106 and 107 (nominally 2 seconds). During the on time, the "No" indicator 20 is turned on and the indicator 22 above the Key 12 corresponding to the correct answer is turned on via binary to decimal converter 122. At the end of this time, the next question display 146 is incremented and the ROM 60 is clocked as described above.

It should be noted that the answer input buttons are locked out for the nominal two seconds display time so that any data input either accidentally or intentionally during this time will be ignored.

Although several dual-in-line (DIP) integrated circuit packages were utilized in constructing the CALCULEARNER, the technique of large-scale-integration (LSI) could be implemented here to reduce the number of packages to one or two as done in modern pocket calculators. In addition, a type of metal-oxide-semiconductor (MOS) circuit fabrication, such as complementary-MOS (CMOS) could be employed in order to reduce power consumption and increase noise immunity.

While light-emitting-diodes (LEDS), with their long life and low power consumption, are preferred for the displays, other types, such as liquid crystal and gas discharge may also be employed. The drive and decoding circuitry associated with these displays were not shown nor described since they are well known in the art.

Another feature not previously discussed since it is also well known in the art is the power supply, which may be a rechargeable nickel-cadmium battery, disposable battery, or AC to DC converter type.

It should also be noted that even though the device is to be used primarily in the educational field, it may also be utilized as a question and answer game apparatus.

It is to be understood that the above descriptive arrangements are merely illustrative of the principles of this invention and various other arrangements and modifications may be made without departing from the spirit and scope of the invention as hereinafter claimed.

What is claimed is:

1. A programmable question and answer device having combined testing and teaching modes with multiple answer set programs, said device comprising in combination:

a housing;

a plurality of indexed answer keys mounted on said housing;

control logic means connected to said answer keys, said control logic means having parallel address means;

non-volatile read out memory means electrically connected to said control logic means, said memory means having a plurality of stored binary words output in parallel by said parallel address means;

program selector means selectively connected to said read only memory means, said control logic means and said answer keys in order to program an operational sequence for a selected answer set; and, a plurality of electrically activated display means selectively connected to said control logic means for indicating question and answer data;

said control logic means comprises, sequencing logic means connected to said display means and said read only memory means for advancing binary data during an answer program sequence, comparison logic means connected to said program selector means to check validity of permissible answers and student answers in each answer set and display timing means connected to said comparison logic means and said display means to limit viewing time of displays showing correctness of a student's answer;

said sequencing logic means comprises, a first binary counter connected to said display means for accumulating the number of correctly answered questions for each answer set, a second binary counter connected to said display means to indicate the number of the next question within an answer set, and a third binary counter connected by parallel lines to said read only memory means for addressing said read only means in order to output a selected binary word.

2. A device as claimed in claim 1, wherein said comparison logic means is comprised of:

a first digital comparator connected to said program selector means to determine if an outputted answer from said read only means is zero or greater than a selected number; and a second digital comparator connected to said program selector means and said display timing means to determine the correctness of a student's answer.

3. A device as claimed in claim 2, wherein said program selector means is comprised of:

a plurality of springlike electromechanical switches mounted in said housing and electrically connected to said read only memory, said first digital comparator, and said second digital comparator; and an electrically insulative activator strip having a conductive printed circuit coded pattern corresponding to a selected answer set, said activator strip insertably mounted in said housing and selectively engaging said electromechanical switches so that a particular program sequence is effected corresponding to a selected answer set.

4. A device as claimed in claim 2, wherein said program selector is comprised of:

a first array of electrically conductive metallic pads formed into a grid pattern and mounted on a plane surface on said housing, said metallic pads selectively connected to said read only memory, said first digital comparator, and said second digital comparator;

a hinged cover element mounted on said housing and in alignment with said first array of metallic pads, said cover element having its lower surface covered with a second array of electrically conductive elastomer pads formed into a grid pattern; and an insulative activator strip insertably mounted between said first array of metallic pads and said second array of elastomer pads, said activator strip having coded slots in alignment with said first and second array of pads so that a particular program sequence is produced corresponding to a selected answer set when said first array of metallic pads are selectively switched by contacting said cover element elastomer pads, under pressure, through said coded slots of said activator strip.

5. A device as claimed in claim 2, wherein said display means is comprised of:

a first display means connected to said sequencing logic means indicating the accumulated score of correctly answered questions;

a second display means connected to said display sequencing logic indicating the number of the next question to be answered;

a third display means connected to said display timing means indicating when a question has been correctly answered;

a fourth display means connected to said display timing means indicating when a question has been incorrectly answered; and a fifth display means connected to said first digital comparator indicating the correct answer when an incorrect answer key was depressed.

6. A device as claimed in claim 1, wherein said display timing means is comprised of:

a first electronic timer connected to said comparison logic means, said first electronic timer energized for a predetermined time whenever a student makes a correct answer; and a second electronic timer connected to said comparison logic means, said second electronic timer energized for a predetermined time whenever a student makes an incorrect answer.

* * * * *